United States Patent [19]

Grotto

[11] 4,222,755
[45] Sep. 16, 1980

[54] AIR FILTER ARRANGEMENT TO PERMIT CLEANING WITHOUT REMOVING ELEMENT

[76] Inventor: LaVon P. Grotto, R.R. 3, Box 62, Litchfield, Minn. 55355

[21] Appl. No.: 961,493

[22] Filed: Nov. 17, 1978

[51] Int. Cl.³ .......................................... B01D 46/04
[52] U.S. Cl. .......................................... 55/291; 55/304; 55/385 B; 55/498; 55/502; 55/503; 55/505
[58] Field of Search ................. 55/288, 290, 291, 293, 55/302, 304, 351, 385 B, 400, 422, 498, 502, 503, 505; 209/406, 410

[56] References Cited

U.S. PATENT DOCUMENTS

| | | | |
|---|---|---|---|
| 342,283 | 5/1886 | Cavanaugh | 209/406 |
| 1,340,058 | 5/1920 | Lambert | 55/406 |
| 1,397,001 | 11/1921 | Garner | 55/351 |
| 2,380,321 | 7/1945 | Lykken et al. | 55/400 |
| 3,078,650 | 2/1963 | Anderson et al. | 55/337 |
| 3,307,336 | 3/1967 | Dewsberry | 55/385 B |
| 3,357,163 | 12/1967 | Burger et al. | 55/385 B |
| 3,616,618 | 11/1971 | Gronholz et al. | 55/337 |
| 3,670,480 | 6/1972 | Petersen | 55/430 |
| 3,672,130 | 6/1972 | Sullivan et al. | 55/323 |
| 3,740,932 | 6/1973 | Borsheim | 55/394 |
| 3,778,982 | 12/1973 | Birke | 55/290 |
| 3,857,687 | 12/1974 | Hamilton et al. | 55/337 |
| 3,898,066 | 8/1975 | Miskiewicz | 55/317 |
| 3,907,529 | 9/1975 | Borsheim | 55/337 |
| 3,998,656 | 12/1976 | Grotto | 134/33 |
| 4,130,404 | 12/1978 | Bergdahl | 55/291 |

FOREIGN PATENT DOCUMENTS 816376 7/1959 United Kingdom .................. 55/290

Primary Examiner—David L. Lacey
Attorney, Agent, or Firm—Kinney, Lange, Braddock, Westman and Fairbairn

[57] ABSTRACT

An air filter for use on internal combustion engines which operate primarily in heavy dust conditions, and which includes a mounting member as part of the air filter housing that permits the spinning of the air filter cartridge for centrifugal cleaning in place on the internal combustion engine, without removal of the filter cartridge from the air filter housing.

11 Claims, 5 Drawing Figures

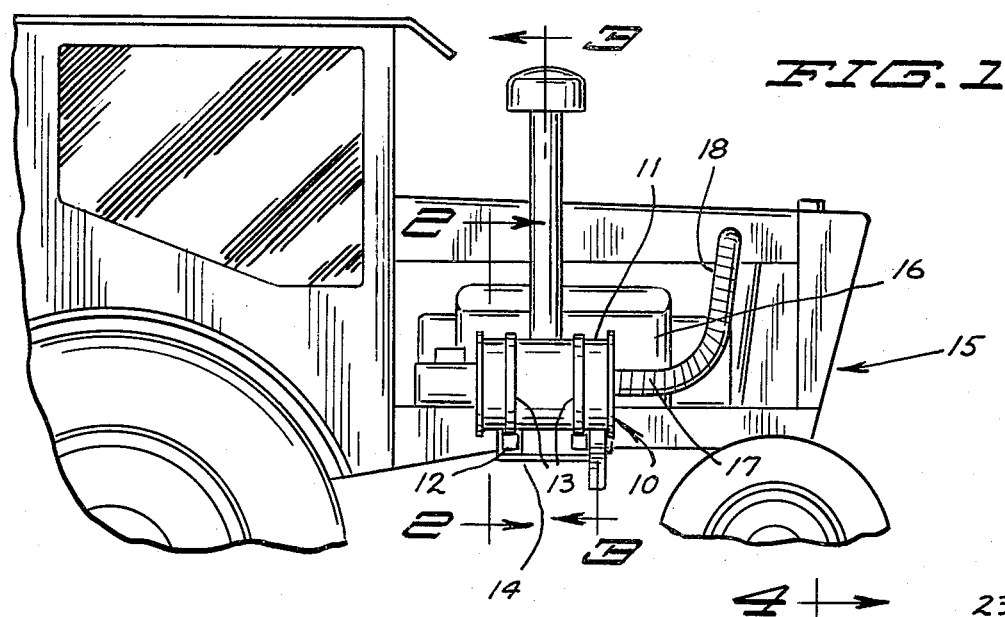
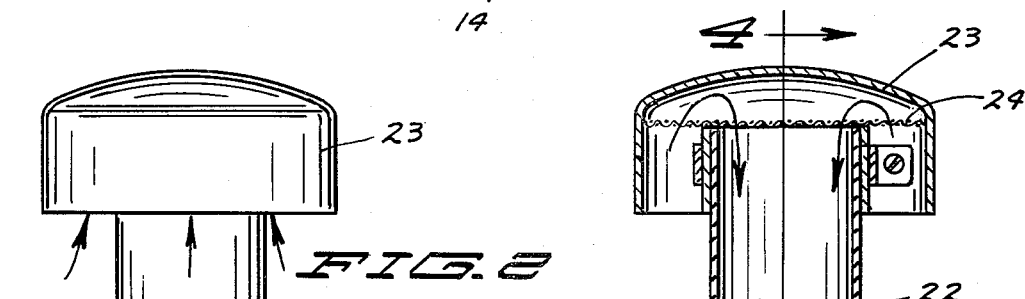
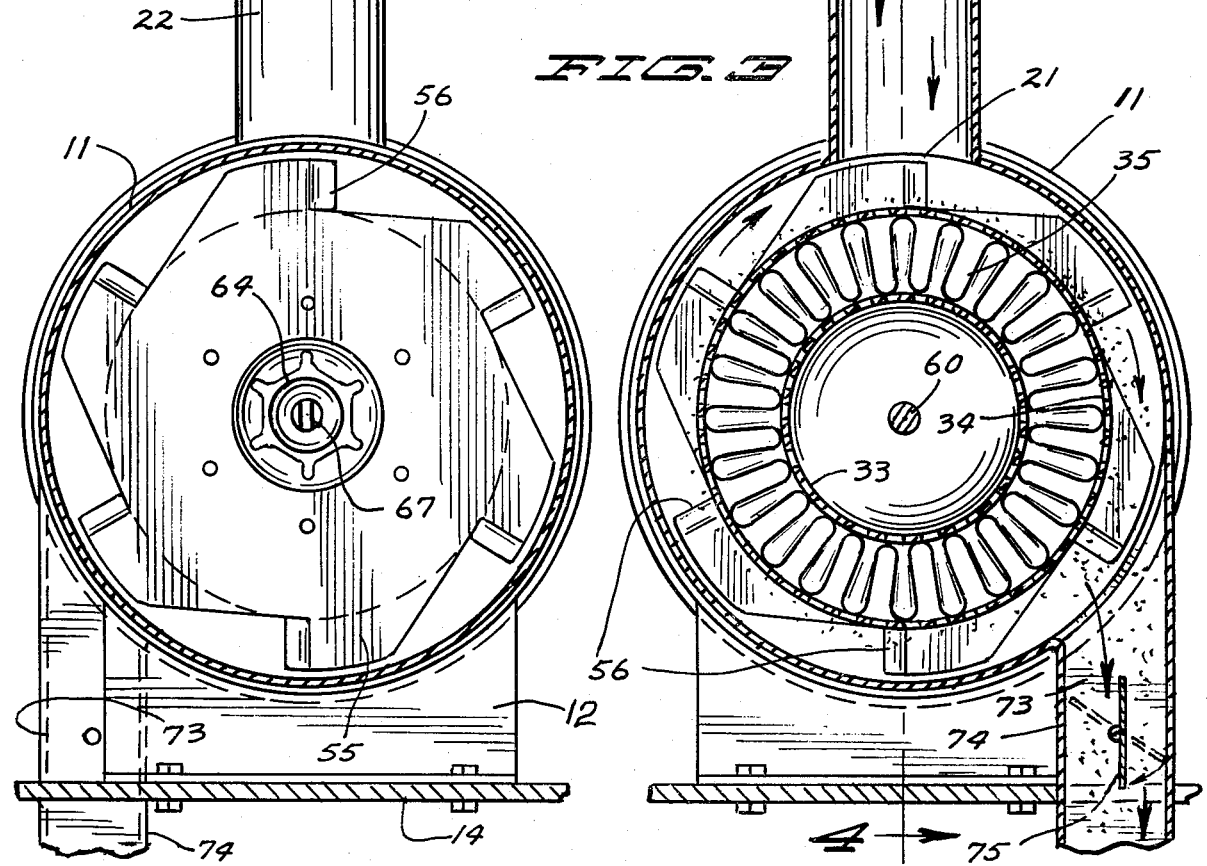

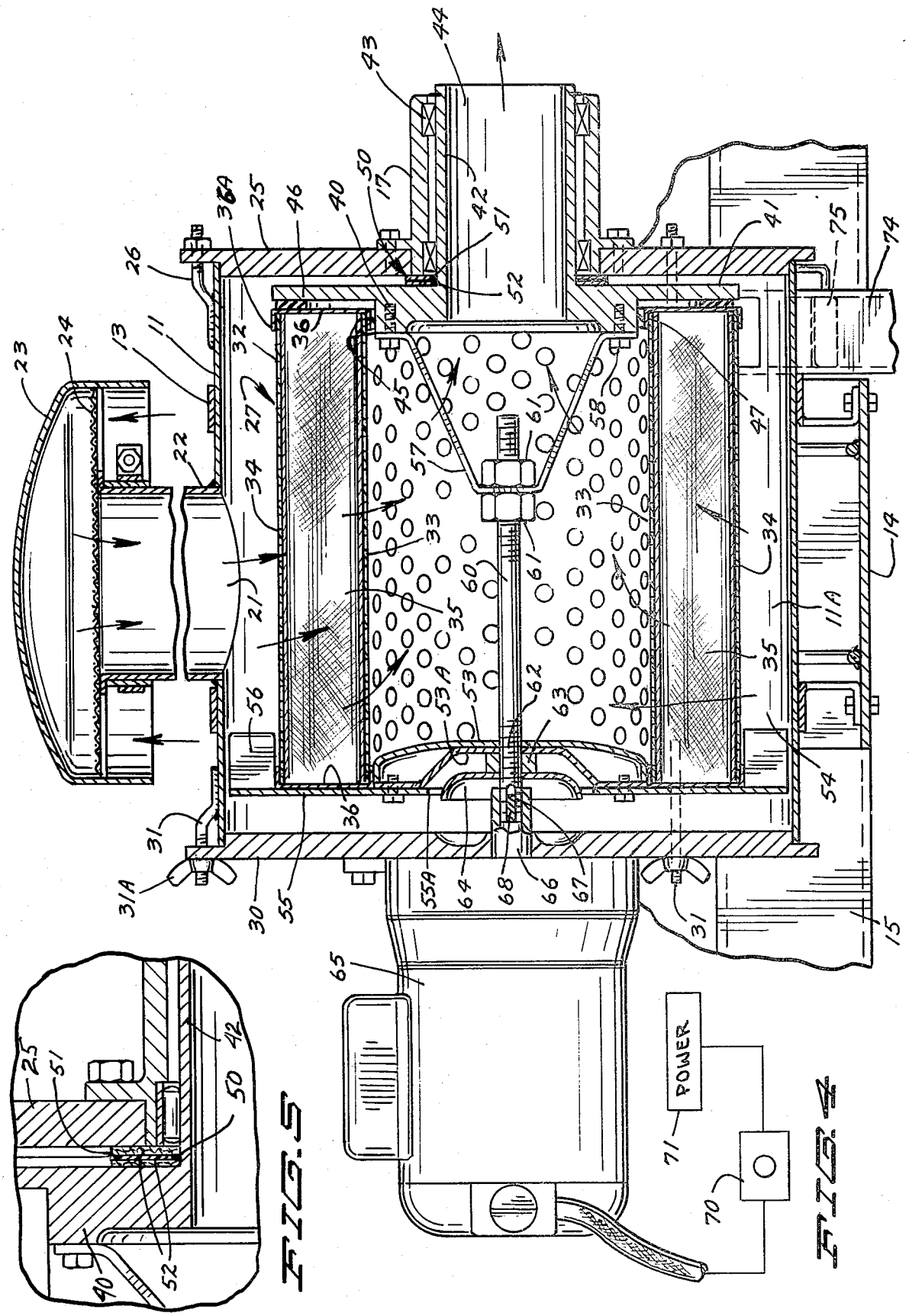

AIR FILTER ARRANGEMENT TO PERMIT CLEANING WITHOUT REMOVING ELEMENT

BACKGROUND OF THE INVENTION

1. Field of the Invention

The present invention relates to air filter units which are stationary in use, and which include a rotatable mounting to permit the filter cartridge to be rotated under centrifugal force for cleaning without removal.

2. Prior Art

My U.S. Pat. No. 3,998,656 teaches the importance of cleaning cylindrical air filters, and in particular cleaning pleated type paper cartridges and other hollow cylindrical filters by centrifugal force combined with a forced reverse airflow. The device shown therein requires the removal of the air filter cartridge from the filter housing on the vehicle or internal combustion engine with which it is used.

Other devices in the prior art include centrifugal filters which are rotated for filtering action, usually comprising a perforated rotatable drum in a housing to provide air filtering action from the centrifugal force on the rotating unit. This type of filter is not adapted for static operation, and generally does not have as efficient operation as a stationary paper type pleated filter. The centrifugal cleaning action also tends to reduce airflow through the element. Such a device is shown in U.S. Pat. No. 3,857,687 and also in U.S. Pat. No. 3,907,529 for typical showing.

Other air cleaner devices are used which utilize baffles to cause a circumferential flow of air. Patents which illustrate this principle include U.S. Pat. Nos. 3,672,130; 3,740,932; 3,616,618; 3,670,480; and 3,078,650. These devices primarily rely upon the principle of having the air itself rotating or moving annularly so that the entrained particles will be thrown outwardly from the air, while the filter element remains stationary.

U.S. Pat. No. 3,898,066 shows a rotating filter element within a housing that is operated by turbine blades to rotate the filter housing during use from the air that passes through the filter.

An early type air cleaner is shown in U.S. Pat. No. 1,340,058 wherein a plurality of blades rotate during use to attempt to utilize centrifugal force to separate dust from the incoming air in an internal combustion engine.

SUMMARY OF THE INVENTION

The present invention relates to an air filter for intake air of internal combustion engines which utilizes a nonrotating filter cartridge or element during use, but which includes a mounting for the filter element within the air filter housing combined with a power source to permit the rotation of the filter element about a central axis for centrifugal cleaning of the filter element after use.

Efficiency in large internal combustion engines, and in particular, diesel engines operating near maximum horsepower is generally limited by intake air volume. Many engines at the present time operate at a power level wherein insufficient "breathing" or volume of intake air limits the power output, and also reduces the amount of power obtained per pound of fuel. With increasing costs of energy, the inefficiencies in internal combustion engines result in a good bit of unused energy going out the exhaust pipe of the internal combustion engines, and therefore the cost of operation is substantially increased, and usable energy is wasted.

When air filters that have adequate capacity to provide the necessary air supply to the intake of the internal combustion engine are in use, after short periods of operation in dusty conditions the capacity of the filter can be greatly diminished by the collection of particles of dust on the exterior of the filter, particularly in pleated paper type filters which do have high airflow and good filtering characteristics.

As outlined in my previous patent, the need for cleaning exists, but human nature being what it is, any slight additional effort needed for cleaning tends to discourage such cleaning and thus the performance of engines suffers.

In the form of the invention shown herein, small fan blades are mounted to rotate with the filter cartridge or element when it is being cleaned to create a small flow of air that tends to urge the dust particles being thrown outwardly toward a provided dust outlet opening. The device thus forms a readily usable unit that is mounted integrally with the vehicle on which the internal combustion engine is used, or can be mounted closely adjacent to the internal combustion engine as a unit. After a period of use, the filter element can be cleaned immediately to increase the likelihood of desirable cleaning to maintain the efficiency of the filter and thereby conserve fuel through more efficient operation of internal combustion engines.

BRIEF DESCRIPTION OF THE DRAWINGS

FIG. 1 is a fragmentary side view of a typical tractor showing an internal combustion engine utilizing a filter assembly made according to the present invention installed on the tractor;

FIG. 2 is a sectional view taken as on line 2—2 in FIG. 1;

FIG. 3 is a sectional view taken as on line 3—3 in FIG. 1;

FIG. 4 is a longitudinal sectional view of the filter assembly taken as on line 4—4 in FIG. 3; and FIG. 5 is a fragmentary enlarged sectional view of an air seal between the facing rotating surfaces at one end of the filter housing.

DESCRIPTION OF THE PREFERRED EMBODIMENT

A typical air filter utilizing a cleaning system made according to the present invention is illustrated at 10, and as shown includes an outer housing 11 which has a mounting frame 12 held in position with suitable attaching members 13. The mounting frame 12 in turn is attached to a support pedestal 14 that is attached to the frame 15 of a tractor in the form shown. The tractor has an internal combustion engine 16, of usual design, and of course the internal combustion engine may be a diesel engine, or a gasoline engine. Tractors operate in extremely dusty conditions, and it is important to keep the flow of intake air to the engine at a high rate to provide adequate "breathing" for the engine to permit it to efficiently utilize fuel. As shown, a normal outlet connection tube 17 of the filter assembly is connected through a hose 18 to the air intake of the internal combustion engine 16.

The bracket or mounting pedestal 14 mounts the housing 11 and the internal filter element closely adjacent the internal combustion engine 16 with which it is used.

The internal construction of the filter assembly 10 is shown in detail in FIGS. 2 through 5. As shown, the outer housing 11 has an air intake port 21 connected to a stack 22 that has the usual weather cap 23 with a screen 24 in the cap intake.

The outer housing 11 is a cylindrical drum housing, and has a first end plate or cap 25 attached to the housing with suitable connector bolts 26. The end cap 25 in turn supports the outlet tube 17 which in the form shown is cylindrical. A filter assembly 27 is mounted in the interior of the housing. The opposite end of the housing 11 from cap 25 is closed with a second removable end cap 30 that is held in place with fastening studs 31 including wing nuts 31A that permit the end plate 30 to be removed with relative ease.

The filter assembly 27 includes a filter element or cartridge 32 that is of usual pleated paper design and has an inner perforated shell 33, and an outer perforated shell 34, which is concentric with and spaced outwardly from the inner shell 33. A pleated paper filter element indicated generally at 35 is mounted between the inner and outer shells 33 and 34. The inner and outer shells 33 and 34 are held together by end caps 36, which are annular bands that extend around and hold the shells in assembled condition. These end caps 36 have small flanges 36A overlapping the inner and outer shells to hold the assembly together. This type of a filter element is a standard element that is available commercially, and normally is used with conventional type air filters or air cleaners. The elements are generally mounted nonrotationally in position inside of an interior housing.

The mounting for filter assembly 27 in the present invention includes a main filter support or mounting member 40, which has a generally radially extending flange 41 and a center internal tubular hub 42. The hub 42 is mounted in suitable bearings 43 within the outlet tube 17. It should be noted that outlet tube 17 is attached to the end plate 25 securely, and forms a bearing cage usable for supporting the hub 42. The interior passageway 44 of the hub 42 is the normal air outlet for filtered air as will be explained.

The flange 41, on its interior facing surface, is turned down to form a support shoulder indicated at 45 on which the inner flange 36A of one end plate 36 of the filter element or cartridge is piloted. The shoulder 45 forms an annular shoulder surface for supporting the cartridge 32 and centering it relative to the axis of rotation of the hub 42. The flange portion 41 that extends radially out from shoulder 45 forms a backing for support and sealing of the filter element.

As shown, suitable seal members 46 can be used annularly around the outer edge of the flange 41 to seat adjacent end cap 36 to prevent air leakage along this face toward outlet 44. Additionally, on the outer surface of the shoulder 45 suitable mounting and sealing means can be provided as shown at 47, to insure a tight air seal around this interior end of the filter cartridge or element 32.

In order to provide an adequate air seal for the rotating hub 42 relative to the outer housing 17 and bearings 43, a seal assembly indicated generally at 50 (see FIGS. 4 and 5) is provided between the inner surface of the end plate 25 and the facing surface of the filter element support or mounting member 40. This seal assembly 50 includes a first annular disc 51 of suitable low friction seal material such as tetraflouroethylene (Teflon), positioned between a pair of fiber or other suitable material discs 52, one on the interior of the housing and the other mounted on the support 40.

These facing seals 51 and 52 will ride in contact with each other and will provide an air seal under static (nonrotating) conditions, which is when the air seal is important because that is when filtered air is provided out the passageway 44. The passage of unfiltered air through this junction into the outlet tubes 17 and 18 is to be avoided.

The filter element 32 is supported at its opposite end with an internal pilot plug 53 which fits within the interior opening of the inner shell 33. This interior opening is illustrated generally at 54. The pilot plug 53 supports a disc 55 that is attached to the plug and extends radially outwardly along the end cap 36 at this end of the cartridge and beyond the outer surface of the outer shell 34. The disc 54 has a plurality of radially extending blades 56 formed thereon which are formed so that the plane of the blade extends in direction of the axis of rotation of the hub 42, and extends outwardly from the outer shell 34. Disc 55 prevents the plug 53 from being pulled axially into the interior opening or chamber 54 of the cartridge 32 more than a desired amount.

The filter element support 40 supports a strap bracket 57 that is attached with suitable cap screws 58 to support 40, and which bracket has a central opening that receives a mounting stud 60. The stud 60 is held in place with lock nuts 61, as shown, and extends substantially along the central axis of the filter element interior chamber 54, and thus along the central axis of the shells 33 and 34 toward the end plate 30 of the housing. The stud 60 passes through an opening in the plug 53, and has a threaded end portion 62 that extends outwardly beyond this plug. It should be noted that the disc 55 has a central opening indicated at 55A and the plug 53 has a recess 53A formed in it. A suitable elastomeric donut seal 63 is provided over the stud 60, and the seal abuts against the outer surface of the plug 53. A hand nut 64 is threaded over the threaded portion 62 to push the plug 53 axially toward the support 57 and toward consequently the support 40. The seal or donut 63 provides an air seal around the stud 60, and the plug 53 pilots the end of the filter element remote from the shoulder 45 and tends to center it. Tightening the nut 64 also forces the filter element 32 against the seal 46, and holds it so that its central axis is substantially along the central axis of the rotating hub 42. The disc 55 seals the end of the chamber 54 and seats the filter element on shoulder 45, against the seals 46 and 47. The plug 53 provides a pilot for centering purposes.

The end plate 30 of the housing as shown has a shoulder that pilots it into place with respect to the housing 11 so that plate 30 is also centered on the housing 11, and the outer surface of the end plate 30 is used for mounting a drive motor 65 of usual design that can be 12 volt, 24 volt, or even can be a 110 volt AC motor. The motor 65 has an output shaft that drives a hub 66 that forms a coupling for receiving the end portion of the stud 60. The end of the stud 60 has a slot 67 to receive a driving tang 68 mounted in the hub 66. The hub 66 thus centers the stud 60 with respect to the hub and by properly mounting the motor 65 so that the center of the hub 66 is in the center of the plate 30, the stud 60 can be very closely aligned with the axis of rotation of the hub 42 at the opposite end of the housing. The motor 65 is controlled through a suitable switch 70 operating from a power source 71 which can be the batteries of the tractor 15, or can be a remote 110 volt source.

In normal operation when the internal combustion engine 16 is running, the air intake tube 18 will be carrying intake air to the internal combustion engine and the airflow will be through the screen 24, stack 22 and into the interior chamber of the housing 11. The air then will pass through the perforated apertures of the outer shell 34, through the paper filter element 35, and into the interior chamber 54. The support 57, is only a strap-like support so that the passageway 44 is substantially completely open to the interior chamber 54 of the filter element. Air will then flow out through the interior passageway 44 to the internal combustion engine, after being filtered. The seals 46, 47, 51, 52 and 63 insure that the air going through the passageway 44 is filtered air. Seals on plate 55 to close chamber 54 may be provided.

The motor 65 remains unenergized during normal use of the filter, and this permits the air to flow easily through the paper element, with the shells 33 and 34 stationary or nonrotating. It should be noted that in many elements using centrifugal force, the air itself is affected by the centrifugal force and tends not to flow through the filter elements so that the capacity of the filter is reduced by centrifugal action. No such problem exists with the present device because the filter element itself is stationary, and the air will flow through the paper filter as desired.

After the engine 16 has been run and used and in particular in dusty conditions, and cleaning of the filter is desired, the switch 70 will be closed, and the motor 65 will rotate the complete filter assembly 27 including the fan blades 56, at a desired direction and at a desired speed. For example, speeds of 1250 to 2,000 rpm have been found to be suitable and tend to throw the dirt vigorously outward from the outer surfaces of the paper filter element 35 into the chamber indicated at 11A that is formed between the outer shell 34 and the inner surface of the housing 11. The fan blades 56 will create a flow of air that will tend to cause a reverse flow through the passageway 44 and outward toward the outside of the filter element. This will also tend to dislodge dirt, although the airflow is relatively small. The dirt of course will be thrown outwardly toward the outer wall of the housing and will tend to slide down to the bottom of housing 11. This dirt will be forced out through a discharge opening 73 formed adjacent one side of the housing, as perhaps best seen in FIGS. 2 and 3. The discharge opening 73 is open to a small rectilinear shaped conduit 74, that discharges downwardly. A lever operated valve 75 that normally is closed is provided in the conduit, and except during cleaning, the airflow tending to come in through the sleeve or tube 74 will be stopped by the valve 75 in closed position.

The dislodged dirt will be forced out by the flow of the air formed by the fan blades 56 and thus the dirt that is collected on the outside of the filter will be discharged out of the housing, and will not again be picked up.

The time of cleaning can be very short, so the actual time of rotation of the filter element is not a significant factor. There is no need for extremely precise bearings that are sometimes necessary for filters that rotate continuously in use.

Thus, the benefits of rotational, centrifugal cleaning are available as well as the benefits of instantaneous cleaning when ever desired. The entire cleaning device is incorporated in with the housing assembly used with the internal combustion engine. By short bursts of cleaning, the efficiency of the paper filter can be maintained at a high level, particularly under extremely dusty conditions. Further, the disadvantages of having air that is being filtered subjected to centrifugal forces is not present with the present device because the filter remains stationary during use.

The filter is rotated at a speed sufficient to cause substantial centrifugal force on the dust particles to tend to throw the dirt off the filter element or cartridge.

What is claimed is:

1. An air filter assembly including an outer housing having a peripheral wall defining a chamber having a central axis and first and second end walls extending generally transverse to the central axis, at least the first end wall being removable, said outer housing having an air inlet and an outlet adapted for connection to an air intake of an engine, filter element means interposed between said inlet and outlet and of a type to filter air passing from said inlet to said outlet without rotation of the filter element means, said outlet being defined by a tube, means to rotatably mount said tube on the first end wall of said outer housing about an axis substantially aligned with the central axis, said filter element means comprising an annular filter ring mounted for rotation with said tube and surrounding the axis of the tube, and means sealing said filter ring relative to the tube to cause air moving from said inlet to said outlet to pass through said filter element means, and motor means mounted on the exterior of the second end wall and having an output shaft extending into the interior of said chamber and substantially aligned with the axis of said tube, coupling means to releasably connect the filter ring to the output shaft, and means to selectively power the motor to thereby rotate said filter element means at a rate sufficient to cause dirt on the exterior of said annular filter ring to be dislodged by centrifugal force.

2. The filter assembly as specified in claim 1 wherein said annular filter ring is mounted for rotation with said tube with means including a radial flange mounted on said tube and positioned in the interior of said housing, and shoulder means on said flange of size to fit within said annular filter ring to support said annular filter ring.

3. The filter assembly of claim 2 further comprising a bracket fixed to said flange, a stud attached to said bracket and mounted substantially concentric with said tube, a pilot plug mounted within said ring at an end thereof opposite from the flange, means on said stud to urge said pilot plug inwardly toward said flange to pilot and center the opposite end of said ring and to thereby support the filter ring on the flange, said coupling means being on the free end of the stud.

4. The filter assembly of claim 3 further comprising means connected to said pilot plug to prevent said plug from moving toward said flange more than a desired amount, the interior of said ring being closed for air movement from the inlet to outlet of the housing except through the filter element means.

5. The filter assembly of claim 4 wherein said means connected to said plug comprises a radially extending member that extends outwardly toward the outer surface of said annular ring, and fan blade means connected to said radially extending element to generate a flow of air when the filter element means is rotated.

6. The filter assembly of claim 5 further comprising a dust outlet opening defined in the housing at the lower side thereof.

7. The filter assembly as specified in claim 1 further comprising a bearing support housing fixed on the at least one end wall of the outer housing and surrounding and rotatably supporting said tube, and seal means to prevent airflow outwardly from said housing between said bearing support and said tubular member.

8. The filter assembly of claim 2 further comprising a first annular seal portion mounted on said first end wall, and a second annular seal portion mounted on the flange and aligned with the first seal portion, and a low friction annular ring sealingly fitted between the seal portions, said seal portions and said low friction ring forming a substantially airtight seal surrounding said tube.

9. An air filter assembly for use with internal combustion engines or the like comprising an outer generally cylindrical housing having a central axis, and having at least one removable end wall extending transverse to the axis of the outer housing, said outer housing having an opposite end wall closing the outer housing, and said outer housing having an air inlet, filter element means within said outer housing, said filter element means having a central opening, means for rotatably mounting said filter element means in the interior of said outer housing including a support assembly comprising a tubular member rotatably mounted on said at least one removable end wall, said tubular member defining an outlet from said housing, and a radially extending flange mounted on said tubular member and positioned adjacent said at least one removable end wall of said housing, means mounting the filter element means onto said flange for movement therewith with the central opening thereof aligned with the tubular member, motor means mounted on the housing adjacent the opposite end wall thereof from said at least one removable end wall and having an output shaft, means to connect said motor means output shaft to said filter element means, and control means to permit selectively energizing said motor means to thereby rotate the output shaft of the motor means and said filter element means at a speed sufficient to cause dust on the filter element means to be dislodged by centrifugal force during rotation of the filter element means, and means forming a dust outlet in the housing for permitting dust dislodged from the filter element means during rotation to be removed from the housing.

10. The air filter assembly of claim 9 wherein said tubular member is rotatably mounted in a mounting housing, a conduit surrounding said mounting housing and adapted to be connected to the intake of an internal combustion engine, the filter element means comprising an annular filter defining an interior central chamber comprising the central opening, an annular shoulder defined on said flange on a side facing away from said at least one removable end wall of the outer housing, said central opening being of size to fit closely over said shoulder.

11. The air filter assembly of claim 10 further comprising stud means connected to said flange and extending substantially concentric with said axis of said annular filter toward an end of the outer housing opposite from the at least one removable end wall, and means to seal the end of the interior central chamber opposite from the annular shoulder including a plug mounted on said stud means and positioned in the interior central chamber, said means to connect comprising coupling means drivably coupling the motor means output shaft to said stud means.

* * * * *